(12) United States Patent
Arata et al.

(10) Patent No.: US 6,837,005 B2
(45) Date of Patent: Jan. 4, 2005

(54) WEATHERSTRIP FOR AUTOMOBILE

(75) Inventors: Mithuaki Arata, Hiroshima (JP); Hitoshi Hamanaka, Hiroshima (JP); Ken Yoshioka, Shizuoka (JP); Kazuhiko Tokutomi, Shizuoka (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/233,716

(22) Filed: Sep. 3, 2002

(65) Prior Publication Data

US 2003/0042752 A1 Mar. 6, 2003

(30) Foreign Application Priority Data

Sep. 3, 2001 (JP) ........................................ 2001-265318

(51) Int. Cl.⁷ ........................... E05D 15/16; E06B 7/16; B60J 1/16
(52) U.S. Cl. ........................... 49/440; 49/377; 49/490.1; 296/146.9
(58) Field of Search ........................... 49/440, 377, 441, 49/475.1, 490.1, 488, 502; 296/146.9, 146.2, 146.16; 277/921

(56) References Cited

U.S. PATENT DOCUMENTS

| 3,742,649 A | * | 7/1973 | Dochnahl | ................... 49/441 |
| 6,141,854 A | | 11/2000 | Mueller et al. | |

FOREIGN PATENT DOCUMENTS

| DE | 1 341 997 | 12/1973 |
| DE | 2 302 120 | 1/1997 |
| DE | 2 362 415 | 11/2001 |
| EP | 0 441 073 | 8/1991 |
| EP | 1 234 700 | 2/2002 |
| FR | 2 718 392 | 4/1994 |
| JP | 2-587880 | 10/1998 |
| JP | 11-189043 | 7/1999 |
| JP | 2000-071763 | 3/2000 |
| JP | 2000-071774 | 3/2000 |

* cited by examiner

*Primary Examiner*—Hugh B. Thompson, II
(74) *Attorney, Agent, or Firm*—Flynn, Thiel, Boutell & Tanis, P.C.

(57) ABSTRACT

A weatherstrip for an automobile includes an attaching portion having an inverse U-shape cross section. A rising portion is formed in a protruding manner on the attaching portion and lip pieces are formed for sealing between a door inner panel and a window glass. The rising portion includes a sloping guide that leads to a concave groove with which the trim end of a trim is fitted and latched. To attach the weatherstrip to the upper edge of an inner panel of a door beltline, the attaching portion is attached to the flange by insertion. Then the trim end of the trim is pressed against the guide and is, thrust so as to be fitted and latched with the concave groove. Since the trim end need not climb over the flange while keeping a weatherstrip attached thereto, even if the angle created by the door beltline and a pillar is an acute angle, the creation of a large gap between the weatherstrip end and the pillar is eliminated.

17 Claims, 6 Drawing Sheets

WEATHERSTRIP FOR AUTOMOBILE

BACKGROUND OF THE INVENTION

The present invention relates to a weatherstrip to be attached to a car door panel for sealing between the same and a window glass and, in particular, to a weatherstrip to be attached to the upper edge of a door inner panel of a door beltline.

As this type of weatherstrip, there is a weatherstrip 21 which is, as shown in FIG. 6, attached to the trim 23 end portion as a door interior material joined to an inner panel 22. In an automobile door having the structure shown in FIG. 6, joining of the trim 23 to the inner panel 22 is carried out in such a manner that the trim 23 is slightly lifted and thrust into the inner panel 22, is then dragged down to latch the trim end with a flange 22a of the inner panel 22, and for joining the trim 23 to the inner panel 22, the trim end needs to climb over the flange.

However, as with an automobile shown in FIG. 7, in a case where the angles of corner portions A and B created by a beltline BL, a front pillar 24, and a rear pillar 25 are acute angles, as the position approximates the pillars 24 and 25, in an attempt to climb over the flange 22a by lifting the trim 23, the trim end comes to make contact against and interfere with the inclined pillar 24 or 25. Especially in a case where, as shown in FIG. 6, the weatherstrip 21 is attached to the trim end in advance and the trim 23 is joined to the inner panel 22, contact against the pillar 24 or 25 easily occurs for the thickness of the weatherstrip 21 on the trim end. Therefore, it is inevitable to attach the weatherstrip end apart from the pillar 24 or 25 and, consequently, as shown in FIG. 8, a gap c where the weatherstrip cannot be attached is created in the corner portions A and B. To deal with this gap, priorly, a method for filling up a gap c by fitting a separate component or a method for attaching a weatherstrip by forcibly pushing the same even if the weatherstrip end makes contact against the pillar 24 or 25 has been employed. However, in the former method for filling up a gap with a component, the number of components increases and the number of processes increases, resulting in high cost. Also, in the latter method, attachment cannot be easily carried out, the external appearance after attachment is not favorable, and damage to the weatherstrip and pillar garnish easily occurs.

As another countermeasure, a method is known, wherein as shown in FIG. 9, a weatherstrip 27 is attached to a flange 26a of an inner panel 26 in advance, a trim 28 is attached so as to fit over the weatherstrip 27, and a rib 28a of a trim 28 is latched with a clip 29 to be attached to the flange 26a (Japanese Registered Utility Model No. 2587880). According to this method, the trim end is laterally inserted to fit over the flange 26a and therefore need not climb over the flange, the gap c as shown in the foregoing FIG. 8 can be reduced, however, in this case as well, the number of components increases, resulting in high cost.

SUMMARY OF THE INVENTION

It is an object of the present invention to provide a weatherstrip for an automobile whereby the aforementioned gap can be reduced without increasing components and processes in number.

A weatherstrip according to one aspect of the invention comprises an attaching portion to be attached to a flange on the upper end of an automobile door inner panel by attaching means. This attaching portion comprises sealing portions which are elastically fitted to a window glass to seal between the door inner panel and window glass and a latching portion which is, when a trim as an interior material is thrust into and joined to the door inner panel, latched with the trim end and restricts movement of the trim end.

According to the present invention, after the weatherstrip is attached to a flange of a door inner panel, the trim as an interior material is joined by latching the trim end with the latching portion of the weatherstrip. And, at the time of joining, the trim end need not climb over the flange while keeping the weatherstrip attached therewith, therefore, even if a pillar at the end of the beltline is inclined and the angle created between the same and door beltline is an acute angle, the weatherstrip can be joined with a reduced gap between the weatherstrip end and pillar. In addition, the trim is joined by latching the trim end with the latching portion of the weatherstrip, therefore, a clip for latching the trim end as shown in FIG. 9 and a connecting work with the clip can be made unnecessary, whereby it becomes possible to reduce cost.

As attaching means for attaching the attaching portion provided in a weatherstrip of the present invention to a flange on the upper edge of an inner panel, for example, protruding pieces or lips which are provided in a protruding manner from opposite surfaces of an inserting groove to be inserted over the flange and grasp the flange can be mentioned, and moreover, a glue for adhering the attaching portion with the flange, a fixedly attaching member, such as a screw or a bolt, for connecting the attaching portion to the flange can be mentioned.

The sealing portions usually have a lip shape but may have a hollow shape.

Also, as the latching portion, for example, a claw or a step which is latched with the trim end from one side and a groove or the like with which the trim end is fitted can be mentioned.

In a weatherstrip according to another aspect of the invention, the aforementioned latching portion of the weatherstrip is a concave groove facing upward, and the trim end which is formed to face downward is fitted therewith.

According to the present invention, the trim end is restricted in terms of its movement and is positioned at an appointed position, whereby it becomes possible to attach the trim at a moderate position so as not to approach the window glass too close.

In a weatherstrip according to still another aspect of the invention, a sloping or curved guide means leading to the latching portion is formed, and at the time of joining of the trim, the trim end which is formed to face downward reaches the latching portion by being guided by the guiding means and is latched with said latching portion.

According to the present invention, it becomes possible that, when the trim is thrust into the inner panel, the trim end is guided by the guide means and is latched with the latching portion smoothly and securely.

It is desirable that the aforementioned weatherstrip has a rack portion and the guide means is formed continuously from the rack portion. This is because if the trim end is placed on the rack portion and is thrust, the trim end is latched with the latching portion via the guide means and owing to provision of the rack portion, it becomes possible to smoothly carry out a shift of the trim end to the guide means.

In a weatherstrip according to still another aspect of the invention, the attaching portion has an inserting groove to be inserted over a flange and thus forms an inverse U-shape in terms of its section and a protrusion which makes contact with a flange side and thereby prevents the attaching portion from inclining when being attached by insertion is formed in a protruding manner in the inserting groove or a thick-walled portion is formed.

The above protrusion or thick-walled portion may be formed on one of the opposed surfaces which form the inserting groove or may be formed on both thereof. Moreover, formation thereof may be at one place or may be at a plurality of places.

In a weatherstrip according to still another aspect of the invention, lip pieces for guiding the weatherstrip so that, when the attaching portion is inserted over the flange, the protrusion or thick-walled portion is prevented from being caught on a top portion of the flange are formed below the protrusion or thick walled portion.

According to the present invention, the weatherstrip is, when inserted over the flange, guided by the lip pieces, whereby it becomes possible to insert the attaching portion over the flange without the protrusion being caught on the top portion of the flange.

In a weatherstrip according to a further aspect of the invention, the aforementioned attaching portion has an inserting groove to be inserted over a flange and also has a claw portion to be latched with a hook-up portion formed on the flange.

According to the present invention, by latching the claw portion with the hook-up portion, it becomes possible to carry out positioning when the attaching portion is inserted over the flange, and to prevent the weatherstrip from coming off the flange and prevent inclination.

DESCRIPTION OF THE PREFERRED EMBODIMENT

Figure 1:
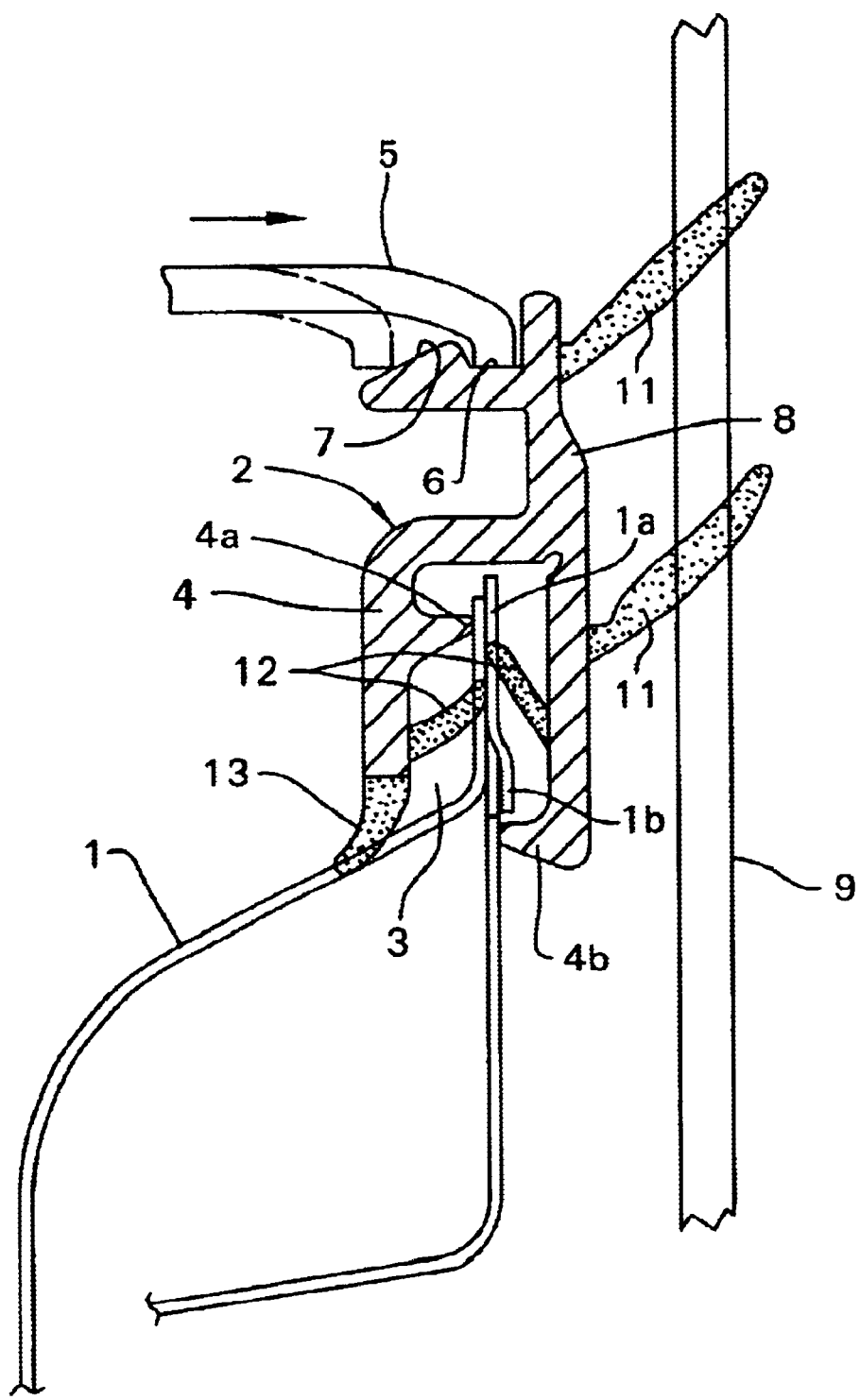
FIG. 1 is a sectional view of a weatherstrip attached to a flange on the upper edge of a door inner panel.
Figure 7:
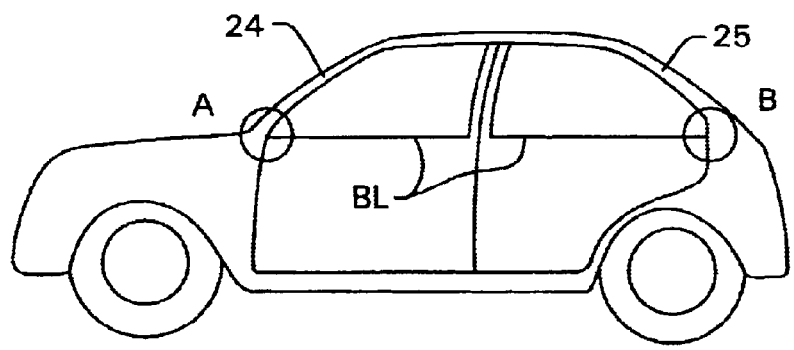
FIG. 7 is a side view of an automobile.
Figure 8:
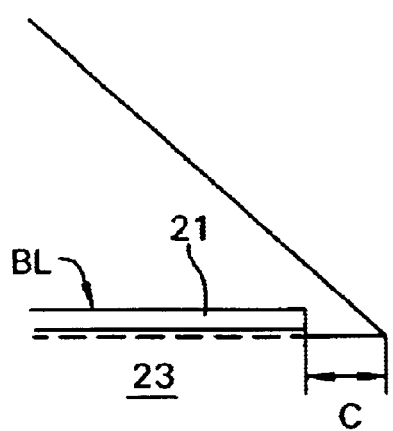
FIG. 8 is a schematic view showing a gap of a weatherstrip end in section B of FIG. 7.
Figure 9:
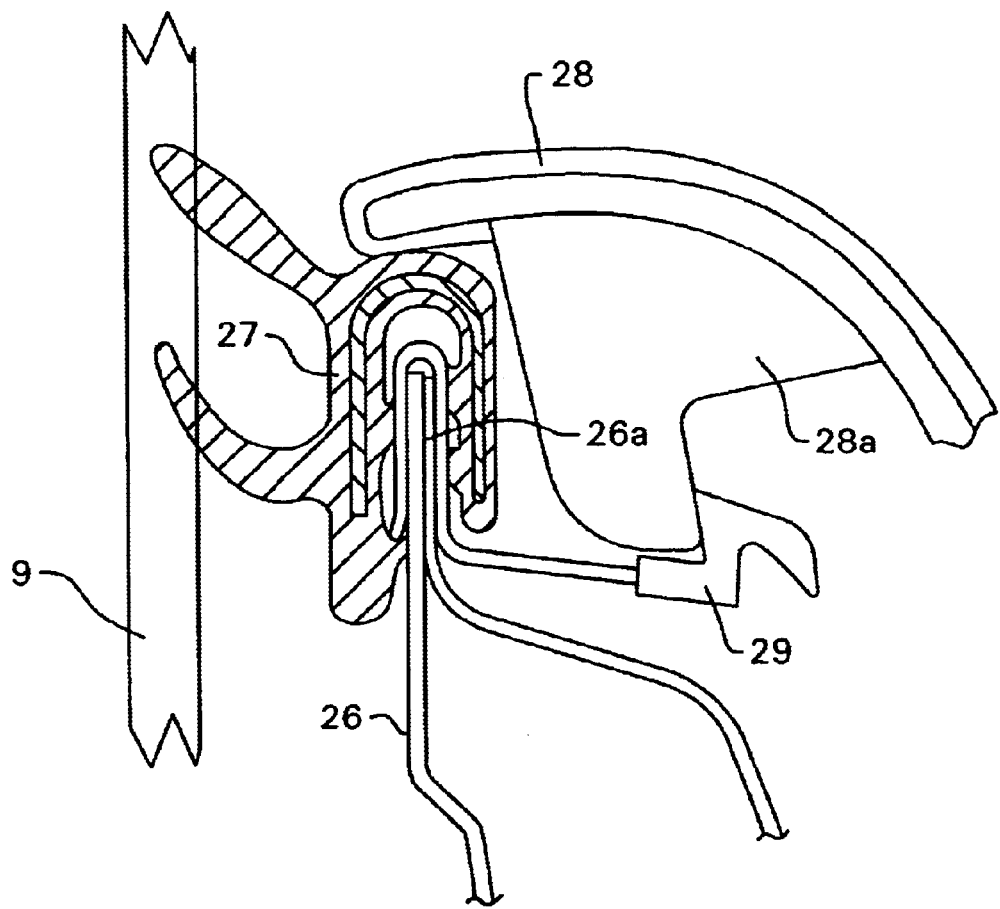
FIG. 9 shows a prior weatherstrip attached to a flange on the upper end of a door inner panel.

FIG. 1 shows a weatherstrip 2 attached to a flange 1a on the upper edge of an inner panel 1 of automobile beltlines BL shown in FIG. 7. This weatherstrip 2 comprises: an attaching portion 4 which has an inserting groove 3 to be inserted over a flange 1a and thus forms an inverse U-shape in terms of its section; a rising portion 8 formed in a protruding manner on this attaching portion 4; and lip pieces 11 which are provided in a laterally protruding manner from the above attaching portion 4 and rising portion 8 and serve as sealing portions for sealing between the door inner panel and a window glass 9 by being elastically fitted to the window glass 9; wherein in said attaching portion 4, on one side of the inside thereof, a inclination-preventive protrusion 4a which is inwardly protruded and makes contact with a side surface of the flange 1a and thereby prevents the attaching portion 4 from inclining clockwise is formed in a protruding manner, and below the protrusion on the inside of the attaching portion, lip pieces 12 for guiding the weatherstrip 2 when being inserted over the flange 1a are provided in an inwardly protruding manner. Furthermore, on the glass-side lower end of the attaching portion, an inwardly protruding hook-like claw portion 4b is provided, and this claw portion 4b is latched with a hook-up portion 1b formed on the flange 1a to prevent the attaching portion 4 from coming off the flange 1a and also prevents the attaching portion 4 from inclining counterclockwise in terms of FIG. 1.

Moreover, for the attaching portion 4, a lip portion 13 which is elastically fitted to the inner panel 1 is provided on the opposite side to the claw portion 4b.

The rising portion 8 comprises, on a lateral side thereof, a latching portion composed of a concave groove 6 with which the trim end of a trim 5 to be joined to the inner panel 1 is fitted and latched and a sloping guide 7 leading to the concave groove 6.

The aforementioned attaching portion 4 and rising portion 8 are both integratedly molded by use of a hard resin or rubber material, the lip pieces 11 and 12 and the lip portion 13 are all formed of a soft resin or rubber material and are extruded together with the attaching portion 4 and the rising portion 8. As a resin material to be used herein, polyvinyl chloride (PVC), thermoplastic elastomer (TPE) or the like can be used, for example, and as rubber, an ethylene-propylene-diene-terpolymer (EPDM) or the like can be used, for example.

When attaching the weatherstrip 2, the attaching portion 4 is inserted, from the upper side, over the flange 1a on the upper edge of the inner panel. Insertion is carried out until the claw portion 4b is latched with the hook-up portion 1b and is thus prevented from coming off, and positioning when the attaching portion 4 is inserted is carried out by latching with the hook-up portion 1b, and moreover, the lip portion 13 is elastically fitted to the inner panel 1, whereby the weatherstrip 2 is prevented from inclining counterclockwise in terms of FIG. 1.

In addition, when inserting the attaching portion 4 over the flange 1a, the lip pieces 12 guide the weatherstrip 2, whereby the attaching portion 4 is inserted over the flange 1a without the protrusion 4a being caught on a top portion of the flange and is prevented from inclining clockwise in terms of FIG. 1.

After attaching the weatherstrip 2, the trim 5 is integrated into the inner panel 1, and the trim end is fitted and latched with the concave groove 6. When fitting and latching the trim end with the concave groove 6, the trim end is pressed against the guide 7 as shown by the alternate long and short dash line of FIG. 1 and is, in this condition, thrust in the arrow direction of FIG. 1. Thereby, the trim end is guided by the guide 7 and is fitted and latched with the concave groove 6. Thus, the trim 5 is positioned at an appointed position of the inner panel 1 and integrated without the trim end approaching the window glass 9 too close.

Figure 2:
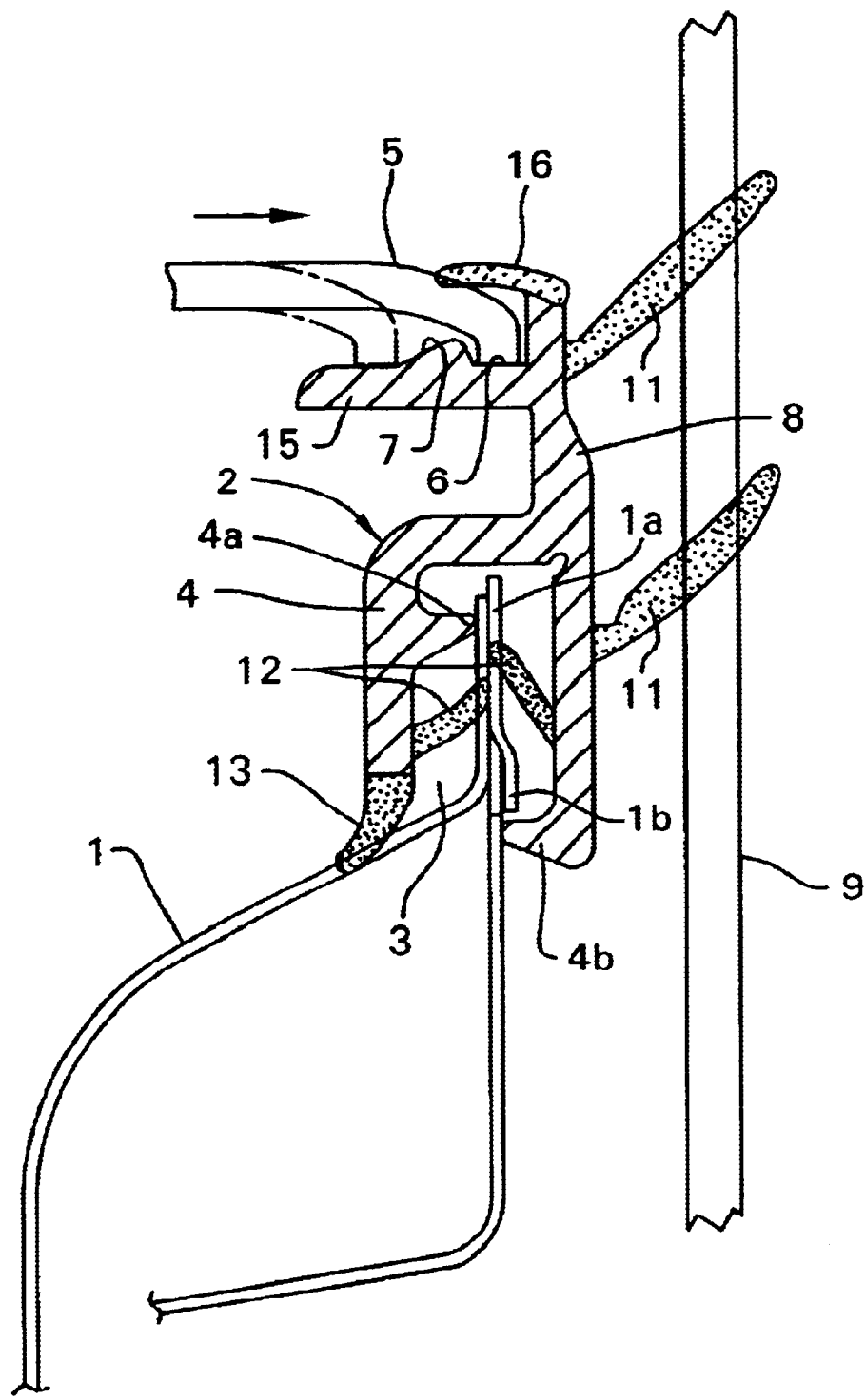
FIG. 2 is a sectional view showing another mode of the weatherstrip.

A weatherstrip shown in FIG. 2 is constructed such that, in the weatherstrip shown in FIG. 1, a rack portion 15 is formed short of the guide 7 of the rising portion 8 and an ornamental lip 16 which is fitted over the concave groove 6 is integratedly formed. For attachment, this weatherstrip is attached to the flange 1a in the same manner as in the above, then the trim 5 is integrated into the inner panel 1, or when the trim end is fitted and latched with the concave groove 6, the trim end is placed on the rack portion 15 as shown by the alternate long and short dash line of FIG. 2, and is, in this condition, slipped on the guide 7, and is fitted and latched with the concave groove 6. The lip 16 is fitted over the trim end and conceals the trim end.

Figure 3:
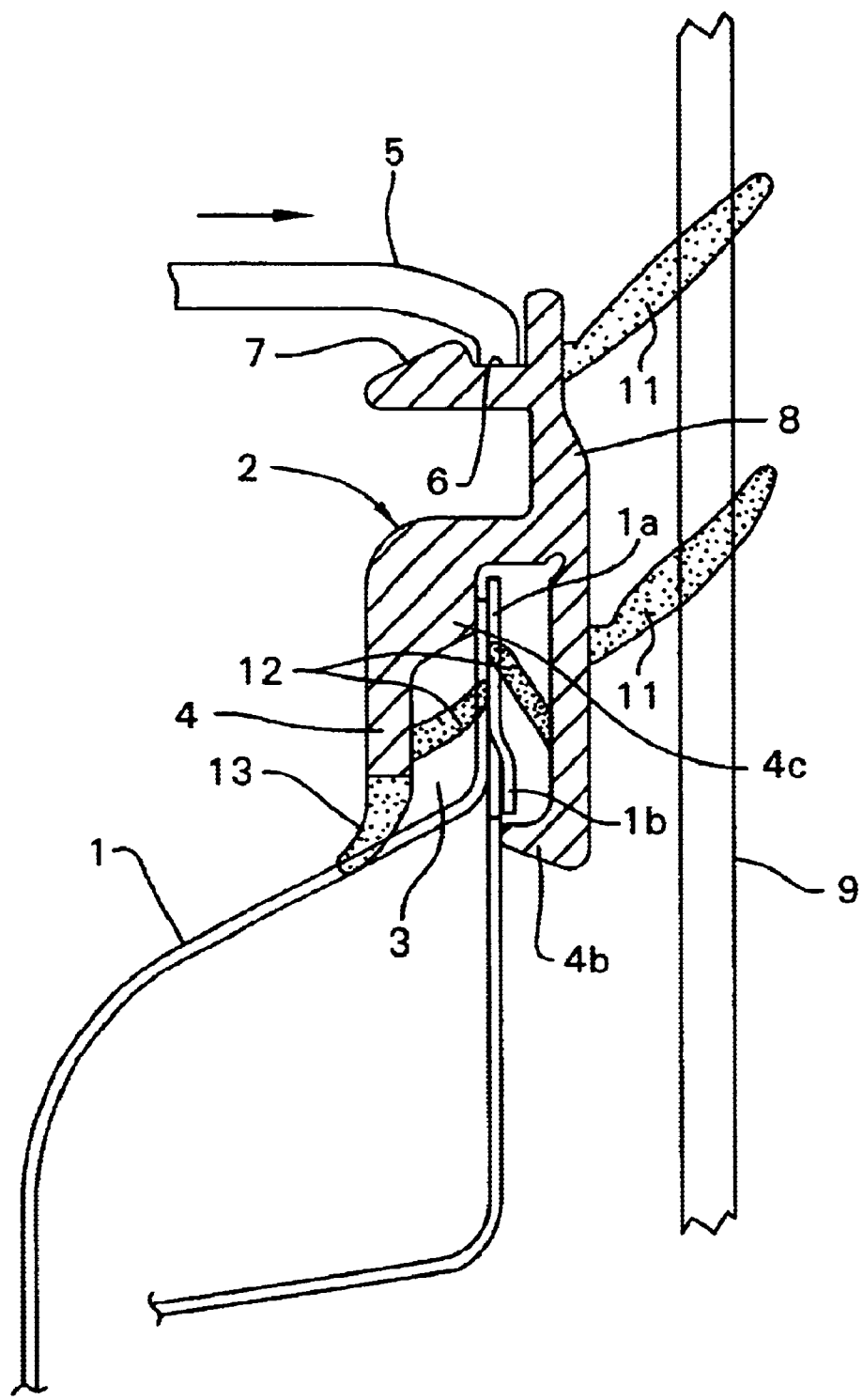
FIG. 3 is a sectional view showing still another mode of the weatherstrip.

A weatherstrip shown in FIG. 3 is constructed such that, in the weatherstrip shown in FIG. 1, in place of the protrusion 4a which makes contact with the side surface of the flange 1a and thereby prevents the attaching portion 4 from inclining clockwise, a thick-walled portion 4c is formed at the attaching portion 4 so that by this thick-wall portion 4c that provides grater rigidity than the protrusion 4a, a function for preventing the attaching portion 4 from inclining more securely than the protrusion 4a is provided.

Figure 4:
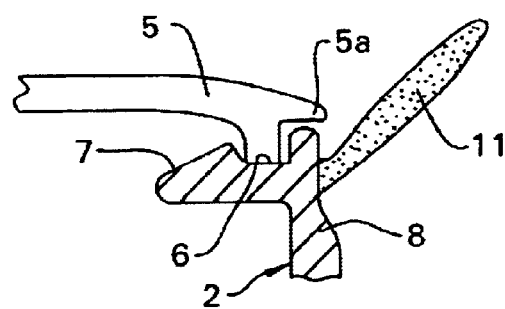
FIG. 4 is a sectional view of a main part showing still another mode of the weatherstrip.

A trim 5 shown in FIG. 4 is constructed such that a projection 5a which is fitted over a top portion of the rising portion 8 is integratedly formed at the trim end, and the top portion of the rising portion 8 of the weatherstrip 2 is covered by the projection 5a provided at the trim end so that the top portion of the rising portion 8 is concealed.

Figure 5:
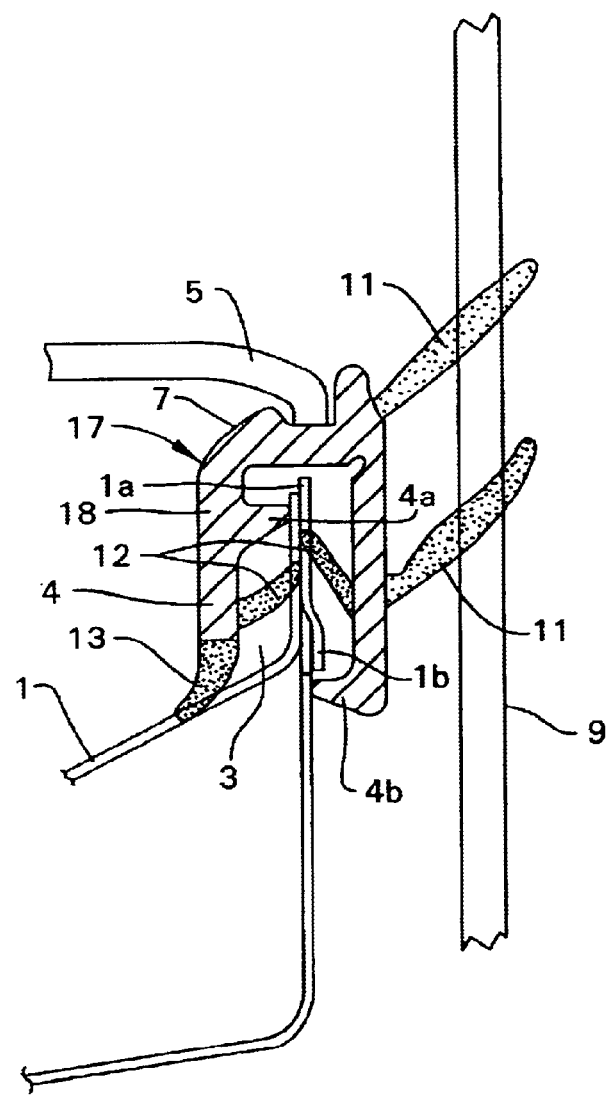
FIG. 5 is a sectional view showing yet another mode of the weatherstrip.
Figure 6:
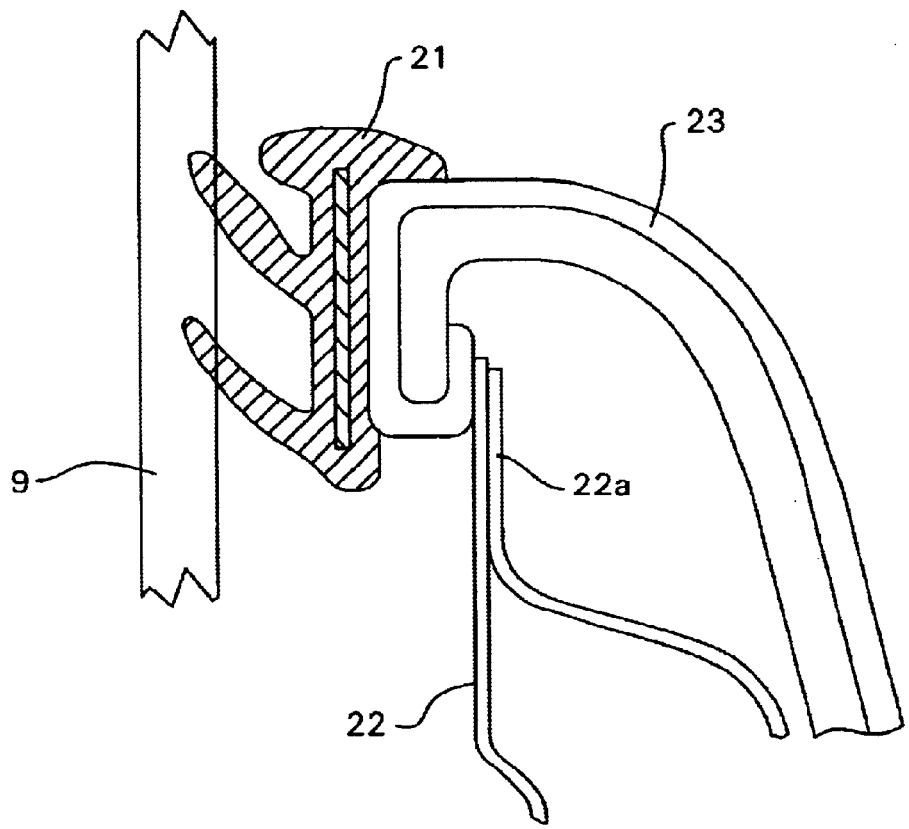
FIG. 6 is a sectional view of a prior weatherstrip attached to a trim end.

A weatherstrip 17 shown in FIG. 5 is constructed such that, a latching portion composed of the convex groove 6 of the weatherstrip 2 as shown in FIG. 1 and a guide 7 leading to the concave groove 6 are provided at an attaching portion 18.

This weatherstrip 17 results in compactness compared with the weatherstrip 2 shown in FIG. 1 due to the absence of the rising portion 8.

Although the present invention has been described in terms of preferred embodiments thereof, it is obvious to a person skilled in the art that various alterations and modifications are possible without departing from the scope of the present invention which is set forth in the appended claims.

What is claimed is:

1. A weatherstrip for attachment to an upper edge of an automobile door inner panel to provide a seal between the door inner panel and a window glass, comprising:
    an attaching portion free from embedded reinforcing members and for attachment to a flange of a door inner panel,
    sealing portions which are provided in a laterally protruding manner from said attaching portion for elastically fitting to a window glass to provide a seal between a door inner panel and a window glass, and
    a latching portion for receiving a trim end from a lateral direction when a trim as an interior material is secured to a door inner panel, said latching portion latching a trim end and restricting movement of a trim.

2. The weatherstrip for an automobile as set forth in claim 1, wherein the latching portion comprises a concave groove facing upward for receiving a trim end which is formed to face downward for fitting in the concave groove.

3. The weatherstrip for an automobile as set forth in claim 1, wherein said weatherstrip includes a sloping or curved guide leading to the latching portion so that a trim end formed to face downward is capable of reaching the latching portion by being guided by the guide and is capable of being latched with said latching portion.

4. The weatherstrip for an automobile as set forth in claim 3, wherein the guide is formed continuously and extends from a rising portion.

5. The weatherstrip for an automobile as set forth in claim 4, wherein
    the attaching portion includes an inserting groove for insertion over a flange to form an inverse U-shape in cross section and one of:
    a protrusion for contacting a side surface of a flange and thereby preventing the attaching portion from inclining, the protrusion being formed in a protruding manner in the inserting groove, and
    a thick-walled portion for contacting a side surface of a flange and thereby preventing the attaching portion from inclining, the thick-walled portion being formed at the attaching portion.

6. The weatherstrip for an automobile as set forth in claim 5, wherein
    below the one of the protrusion and the thick-walled portion, lip pieces for guiding the weatherstrip are formed so that, when the weatherstrip is inserted over a flange, the one of the protrusion and the thick-walled portion is prevented from being caught on a top portion of a flange.

7. The weatherstrip for an automobile as set forth in claim 1, wherein
    the attaching portion includes an inserting groove for insertion over a flange and includes a claw portion for coacting with a hook-up portion formed on a flange.

8. A weatherstrip for providing a seal between a flange of an automobile door inner panel and a window glass comprising:
    an elongate attaching portion free from embedded reinforcing members and having a generally inverse U-shaped cross section with an opening along a length thereof defining a cavity for receiving an upper edge of a flange of a door inner panel, the attaching portion comprising a window section for positioning adjacent a window glass on one side of a flange, an inner panel section for positioning on an opposing second side of a flange, and a joining section integrally joining said inner panel section and said window section;
    a mounting member secured at a lower end of said window section for supporting the end of said window section of said attaching portion at one side of a flange of a door inner panel;
    sealing portions protruding outwardly from the window section for providing a seal between a flange of an inner door panel and a window glass;
    a protrusion secured to the inner panel section of said attaching portion and projecting into the cavity; and
    a latching member for receiving a trim end of a trim,
    wherein in use said protrusion and said mounting member maintain said weatherstrip on a flange of a door inner panel.

9. The weatherstrip according to claim 8, further comprising:
    flexible lip pieces secured to said window section and said inner panel section of said attaching portion and projecting inwardly into the cavity; and
    a flexible lip portion secured at a lower end of said inner panel section and projecting downwardly.

10. The weatherstrip according to claim 9, wherein said mounting member comprises a claw member.

11. The weatherstrip according to claim 8, further comprising a flexible lip portion secured at a lower end of said inner panel section and projecting downwardly.

12. The weatherstrip according to claim 8, wherein said latching member is located adjacent a top part of said joining section of said attaching portion and configured to receive a trim end of trim in a lateral direction, said latching member comprising an upwardly opening groove for receiving a trim end and a sloping guide for assisting in lateral insertion of a trim end into the groove.

13. A weatherstrip for providing a seal between a flange of an automobile door inner panel and a window glass comprising:

an elongate attaching portion having a generally inverse U-shaped cross section with an opening along a length thereof defining a cavity for receiving an upper edge of a flange of a door inner panel, the attaching portion comprising a window section for positioning adjacent a window glass on one side of a flange, an inner panel section for positioning on an opposing second side of a flange, and a joining section integrally joining said inner panel section and said window section;

a mounting member secured at a lower end of said window section for supporting the end of said window section of said attaching portion at one side of a flange of a door inner panel;

sealing portions protruding outwardly from the window section for providing a seal between a flange of an inner door panel and a window glass;

a protrusion secured to the inner panel section of said attaching portion and projecting into the cavity;

a latching member for receiving a trim end of a trim; and said latching member being located adjacent a top part of said joining section of said attaching portion and configured to receive a trim end of trim in a lateral direction, said latching member comprising an upwardly opening groove for receiving a trim end and a sloping guide for assisting in lateral insertion of a trim end into the groove; and a rising portion supporting said latching member on said joining section of said attaching portion, said rising portion having a first end integral with said attaching portion and a second end integral with said latching member;

wherein in use said protrusion and said mounting member maintain said weatherstrip on a flange of a door inner panel.

14. A weatherstrip for providing a seal between a flange of an automobile door inner panel and a window glass comprising:

an elongate attaching portion free from embedded reinforcing members and having a generally inverse U-shaped cross section with an opening along a length thereof defining a cavity for receiving an upper edge of a flange of a door inner panel, the attaching portion comprising a window section for positioning adjacent a window glass on one side of a flange, an inner panel section for positioning on an opposing second side of a flange, and a joining section integrally joining said inner panel section and said window section;

a mounting member secured at a lower end of said window section for supporting the end of said window section of said attaching portion at one side of a flange of a door inner panel;

sealing portions protruding outwardly from the window section for providing a seal between a flange of an inner door panel and a window glass;

a thick-walled portion integral with the inner panel section and projecting into the cavity; and a latching member for receiving a trim end of a trim, wherein in use said thick-walled portion and said mounting member maintain said weatherstrip on a flange of a door inner panel.

15. The weatherstrip according to claim 14, further comprising a flexible lip portion secured at a lower end of said inner panel section and projecting downwardly.

16. The weatherstrip according to claim 14, further comprising:

flexible lip pieces secured to said window section and said inner panel section of said attaching portion and projecting inwardly into the cavity; and a flexible lip portion secured at a lower end of said inner panel section and projecting downwardly.

17. The weatherstrip according to claim 16, wherein said latching member is located adjacent a top part of said joining section of said attaching portion and configured to receive a trim end of a trim in a lateral direction, said latching member comprising an upwardly opening groove for receiving a trim end and a sloping guide for assisting in insertion of a trim end into the groove.

* * * * *